United States Patent
Aditham

(10) Patent No.: US 7,343,526 B2
(45) Date of Patent: Mar. 11, 2008

(54) LOW COST COMPLIANCE TEST SYSTEM AND METHOD

(75) Inventor: Shiva Aditham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 10/732,002

(22) Filed: Dec. 9, 2003

(65) Prior Publication Data

US 2005/0144522 A1 Jun. 30, 2005

(51) Int. Cl.
*G06F 11/00* (2006.01)
(52) U.S. Cl. .................................... 714/47
(58) Field of Classification Search ........... 714/33, 714/47, 56, 39, 43
See application file for complete search history.

(56) References Cited

U.S. PATENT DOCUMENTS

| | | | |
|---|---|---|---|
| 7,028,228 B1 * | 4/2006 | Lovy et al. ............. | 714/57 |
| 7,051,239 B2 * | 5/2006 | Litt ...................... | 714/42 |
| 7,107,340 B2 * | 9/2006 | Chkodrov et al. ....... | 709/224 |
| 7,149,933 B2 * | 12/2006 | Swaine et al. ......... | 714/45 |
| 7,165,190 B1 * | 1/2007 | Srivastava et al. ...... | 714/38 |
| 7,185,235 B2 * | 2/2007 | Radestock ............. | 714/47 |
| 7,191,361 B2 * | 3/2007 | Grey et al. ............ | 714/25 |

* cited by examiner

*Primary Examiner*—Nadeem Iqbal
(74) *Attorney, Agent, or Firm*—Marger Johnson & McCollom, PC

(57) ABSTRACT

The invention(s) relates to a low cost compliance test system and method that includes a processor, a plurality of end points, a chipset capable of facilitating communication between the processor and the plurality of end points, and a switch capable of switching between the plurality of end-points. The switch is capable of intercepting data packets and creating error conditions in selected data packets responsive to the intercepting. And the switch is capable of transmitting the selected data packets and monitoring a response to the selected data packets to determine whether the tested device complies or otherwise operates in accordance with a standard.

20 Claims, 4 Drawing Sheets

LOW COST COMPLIANCE TEST SYSTEM AND METHOD

BACKGROUND

1. Field of the Invention(s)

The invention(s) relates to a semiconductor test system and method. More particularly, the invention(s) relates to a low cost compliance test system and method.

2. Description of the Related Art

Semiconductor devices, e.g., packaged integrated circuits, are typically tested at various points in their manufacture. Testing ensures the devices—and the manufacturing processes used to produce them—are working properly and come within acceptable quality ranges. And testing ensures that the devices comply with implemented communication standards.

BRIEF DESCRIPTION OF THE DRAWINGS

The foregoing and other objects, features, and advantages of the invention(s) will become more readily apparent from the detailed description that references the following drawings.

DETAILED DESCRIPTION OF INVENTION EMBODIMENT(S)

One communication standard may be the Peripheral Component Interconnect Express (PCI Express) standard that replaces the Peripheral Component Interconnect Express (PCI) standard. The PCI Express standard was developed by the PCI Special Interest Group (PCISIG) and can be found on the World Wide Web at www.pcisig.com. A person of reasonable skill in the art should recognize that the invention may apply to communication standards other than the PCI standard.

Figure 1:
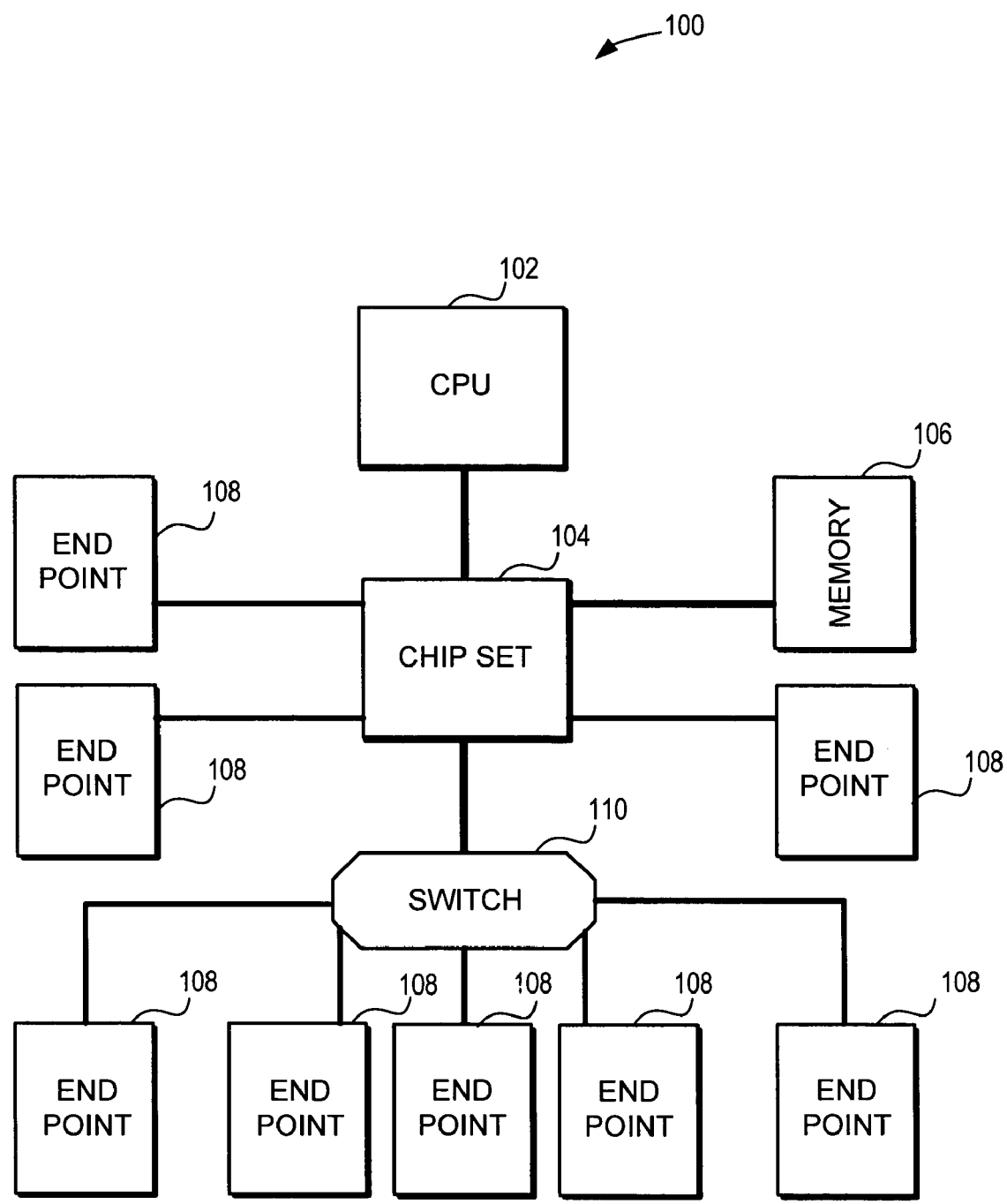
FIG. 1 is a block diagram of a PCI Express system.

The PCI Express standard governs the bus communications in a microprocessor-based system. FIG. 1 is a block diagram of a multi-drop PCI Express system 100 including a processor or central processing unit (CPU) 102, chip set 104, memory 106, and endpoints (e.g., input/output (I/O) devices) 108. The PCI Express system 100 includes an optional switch 110. The switch 110 provides expandability of a PCI Express link to host multiple endpoints. The switch 110 is shown as a separate logical element but may be integrated into the chip set 104.

Testing ensures PCI Express devices like the endpoints 108, switches 110, root complexes (not shown), and bridges (not shown), comply with the PCI Express standard. And testing ensures each of the hardware and software components included in the system 100 interoperate according to the PCI Express standard. Finally, testing validates the system 100's design. This testing typically requires a custom test tool that is complex, stationary, and expensive to buy and operate.

The description of the test system that follows is based on the PCI Express standard. A person of reasonable skill in the art should understand that invention embodiments are likewise applicable to other standards that use similar topologies, e.g., PCI, PCI-X, Universal Serial Bus (USB), InfiniBand, and the like.

Figure 2:
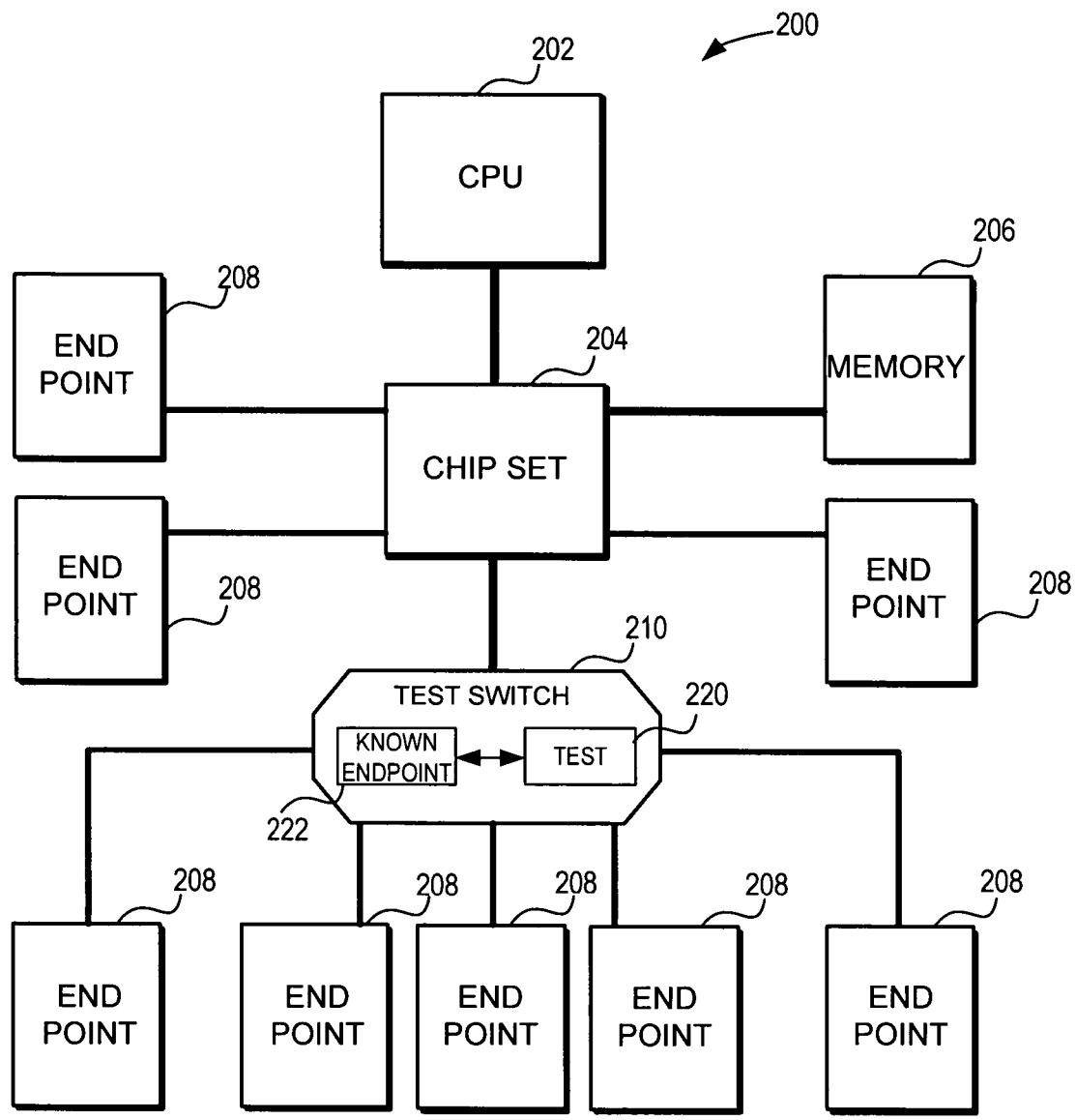
FIG. 2 is a block diagram of a test system according to an invention embodiment.

FIG. 2 is a block diagram of an embodiment of a test system 200. The test system 200, like test system 100, includes a processor or central processing unit (CPU) 202, chip set 204, memory 206, and endpoints (e.g., input/output (I/O) devices) 208. The test system 200 includes an optional test switch 210. The test switch 210 provides for expansion of a PCI express link to different endpoints 208. The test switch 210 is shown as a separate logical element but could be integrated into the chip set 204. The structure and operation of the processor 202, the chip set 204, memory 206, and endpoints 208 are well known and will not be described in further detail.

In one embodiment, the test switch 210 may be an improvement of the switch described in the InfiniBand and PCI Express standards. In another embodiment, the test switch 210 may be an improvement of the bridge described in the PCI-X and the PCI standards. In yet another embodiment, the test switch 210 may be an improvement of the hub described in the Universal Serial Bus (USB) standard. In yet another embodiment, the test switch 210 may be any switch described in any standard that operates as we describe below. The test switch 210 includes the structure and operates as described in the corresponding standard with the inclusion of the improvements we describe below.

The test switch 210 includes a test module 220 and a known endpoint 222 that allow it to test for standard compliance. The test module 220 and known endpoint 222 include circuitry that allows operation as we describe below with reference to FIG. 4.

Figure 3:
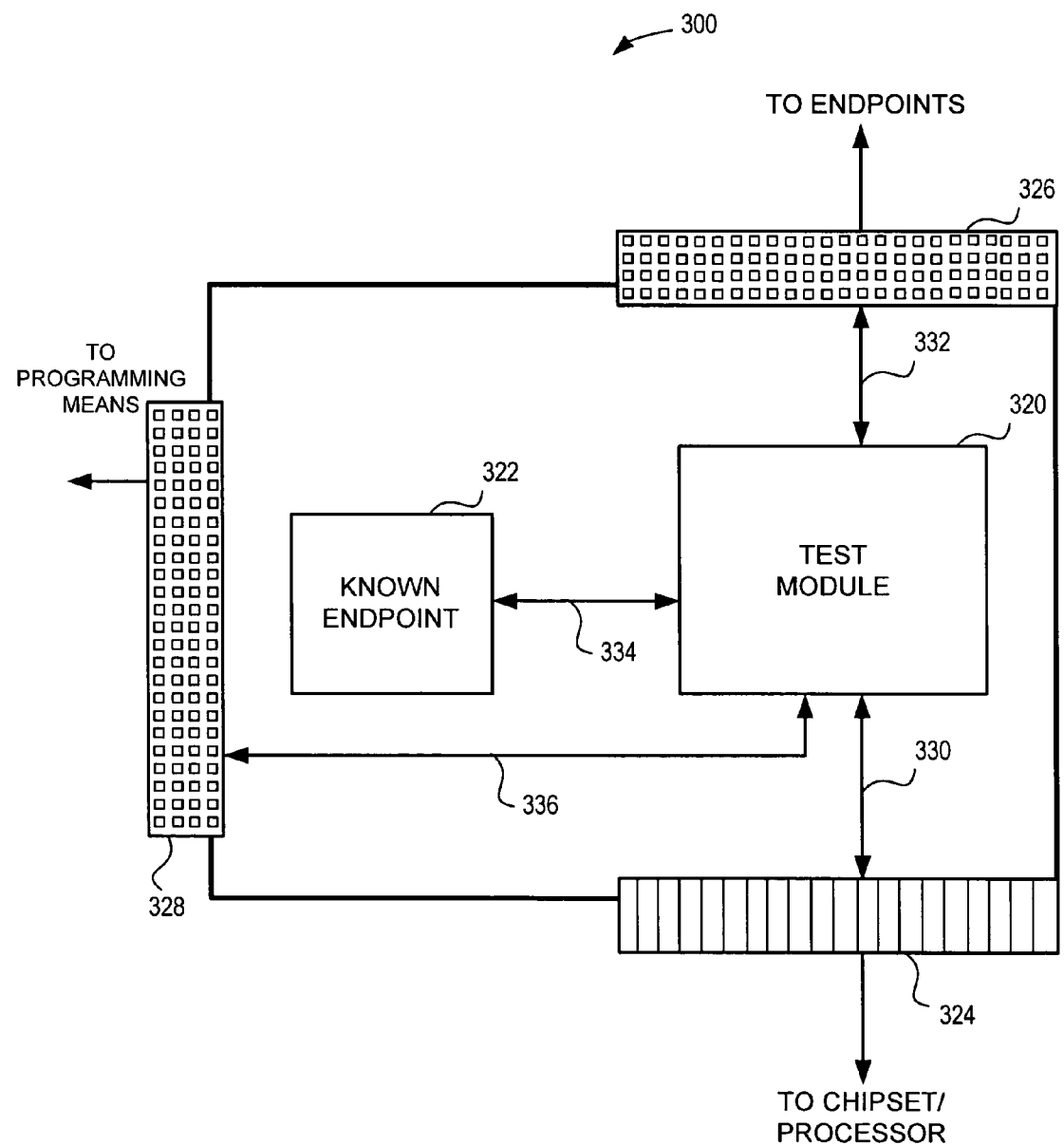
FIG. 3 is a block diagram of a test card according to an invention embodiment.

In one embodiment, the test switch 210 is a test card 300 as shown in FIG. 3. Referring to FIGS. 2 and 3, the test card 300 is coupled to processor 202 directly or through the chipset 204, using the connector 324. In one embodiment, the connector 324 is a PCI Express (e.g., fingers ×1) edge connector. Likewise, the test card 300 is coupled to the endpoints 208 through the connector 326. In one embodiment, the connector 326 is a PCI Express (e.g., ×16) connector. And the test card 300 is coupled to a program means (not shown), e.g., a personal computer, through the connector 328. In one embodiment, the connector 328 is a USB connector.

The test module 320 is communicatively coupled with the processor 202 and/or the chipset 204 using a bus 330. The test module 320 is communicatively coupled with the plurality of endpoints 208 using a bus 332. The test module 320 is communicatively coupled with the programming means (not shown) using a bus 336. The test module 320 is additionally coupled to the known endpoint 322 via a bus 334. In one embodiment, the buses 330, 332, 334, and 336 may be PCI Express buses.

The known endpoint 322 may be an endpoint as defined in the corresponding standard with a known structure and operating characteristics. The known endpoint 322 aids in testing the chipset 204 and/or the processor 202. It should be apparent to a person of reasonable skill in the art that the known endpoint 322 might be omitted from the test card 300.

The test card 300 operates under the control of the programming means (not shown) coupled to it via the connector 328. The programming means (not shown), e.g., a personal computer, controls the test module 320 and endpoint 322. The test card 300, under the control of the programming means (not shown), operates the test method 400 shown in FIG. 4.

Figure 4:
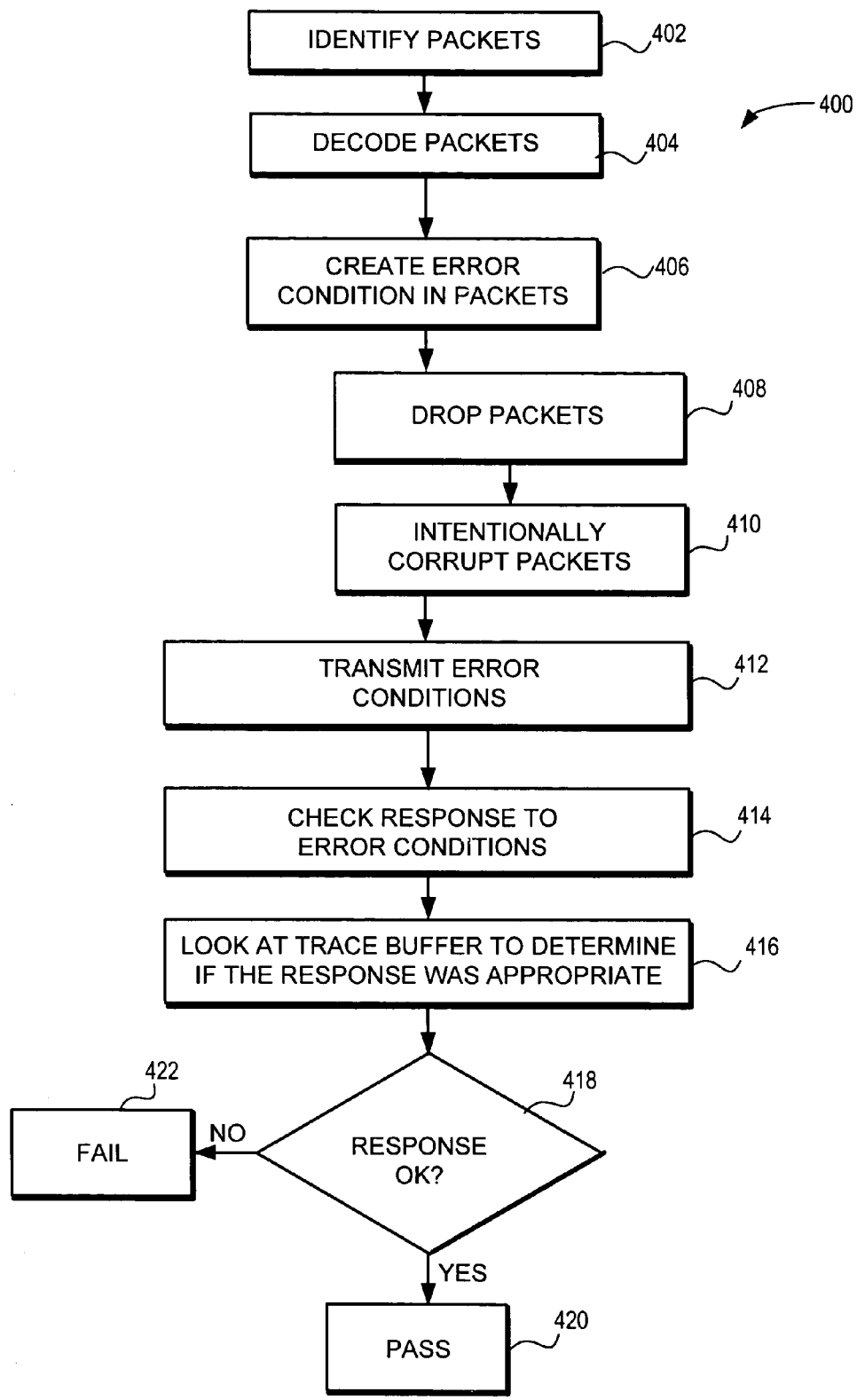
FIG. 4 is a flow diagram of a test method according to an invention embodiment.

Referring to FIGS. 2-4, the test module 320 intercepts and identifies data packets at 402. The data packets might be received from the endpoints 208 or from the chipset 204 and/or processor 202 depending on whether the endpoints 208 or the chipset 204 and/or processor 202 are under test. In one embodiment, the data packets are digitally encoded and include metadata that describes how and when and by whom the data packets were collected. The metadata also describes how the data packets are formatted. The data packets are well known to those of skill in the art.

At 404, the test module 320 decodes the metadata included in the intercepted data packets. At 406, the test module 320 creates error conditions responsive to the decoding. If, for example, the test module 320 determines one or more sequential data packets have a predetermined type, the test module 320 creates error conditions. The predetermined data packet types are, e.g., DLLP or TLP packets.

An embodiment of an error condition may be dropping or eliminating data packets (at 408). Another embodiment of an error condition may be intentionally and, in a predetermined manner, corrupting the data packets (at 410). A person of reasonable skill in the art should recognize the test module 320 might create other error conditions that come within the scope of the present invention.

At 412, the test module 320 transmits the error conditions to the Device Under Test (DUT), e.g., a particular endpoint 208, the processor 202, and/or the chipset 204. At 414, the test module 320 checks the response to the error conditions from the DUT. In one embodiment, a trace buffer (not shown separately from the test module 320) stores bus communications as traces. The test module 320, in turn, analyzes the traces stored in the trace buffer to determine if the DUT's response to the error conditions is in compliance with the appropriate standard (at 416).

At 418, the test module 320 evaluates the DUT's response to the error conditions. If the DUT responds as expected, the test module 320 determines the DUT in compliance with the standard (at 420). If the DUT does not respond as expected, the test module 320 determines the DUT not in compliance with the standard (at 422).

In one embodiment, the test card 300 may test the chipset 204 to determine whether it is compliant with the PCI Express standard. The test module 320 intercepts data packets from the known endpoint 322 to the chipset 204. The test module 320 creates an error condition by, e.g., intentionally corrupting selected ones of the intercepted data packets after their identification by the test module 320. The test module 320 transmits the intentionally corrupted packets to the chipset 204 and monitors its response. If the chipset 204's response is as dictated by the PCI Express standard, the test module 320 determines the chipset 204 compliant. If not, the test module 320 determines the chipset 204 non-compliant.

Similarly, in another embodiment, the test card 300 might test an endpoint 208 to determine whether it is compliant with the PCI Express standard. The test module 320 intercepts data packets from the chipset 204 and/or processor 202 to the Endpoint Under Test (EUT). The test module 320 creates an error condition by, e.g., dropping selected data packets after their identification by the test module 320. The test module 320 transmits the data packets coming before and after the dropped data packets to the EUT and monitors its response. If the EUT's response is as dictated by the PCI Express standard, the test module 320 determines the EUT compliant. If not, the test module 320 determines the EUT non-compliant.

A person of reasonable skill in the art should recognize that the test card might test a variety of devices to compliance with a variety of standards.

Having illustrated and described the principles of our invention(s), it should be readily apparent to those skilled in the art that the invention(s) can be modified in arrangement and detail without departing from such principles. I claim all modifications coming within the spirit and scope of the accompanying claims.

I claim:

1. A test method, comprising:
   intercepting data packets;
   creating error conditions responsive to the intercepting;
   transmitting the error conditions; and
   monitoring a response to the error conditions;
   where creating error conditions includes intentionally corrupting selected data packets.

2. The test method of claim 1 where creating error conditions includes dropping selected data packets.

3. The test method of claim 1 comprising identifying the data packets before creating error conditions.

4. The test method of claim 1 where monitoring the response comprises analyzing traces stored in a trace buffer.

5. The test method of claim 1 comprising determining compliance responsive to the monitoring.

6. A test apparatus, comprising:
   means for identifying data packets;
   means for modifying the data packets responsive to the identifying;
   means for transmitting the modified data packets; and
   means for checking a response to the transmitted data packets where the means for modifying the data packets include means for dropping a predetermined number of the data packets.

7. The test apparatus of claim 6 where the means for modifying data packets includes means for intentionally corrupting data packets.

8. The test apparatus of claim 6 where the means for identifying data packets includes means for identifying two or more sequential data packets having a predetermined type.

9. The test apparatus of claim 6 where means for checking the response includes means for storing a trace indicative of the response.

10. The test apparatus of claim 9 comprising means for determining standard compliance responsive to the trace.

11. A test system, comprising:
    a processor;
    a plurality of end points;
    a bridge capable of facilitating communication between the processor and the plurality of end points; and
    a switch capable of switching between the plurality of endpoints;
    where the switch is capable of:
      intercepting data packets;
      creating error conditions responsive to the intercepting;
      transmitting the error conditions; and
      monitoring a response to error conditions;
      creating the error conditions by intentionally corrupting selected data packets.

12. The test system of claim 11 where the switch is capable of creating the error conditions by dropping selected data packets.

13. The test system of claim 11 where the switch is capable of identifying the data packets before creating the error conditions in selected data packets.

14. The test system of claim 11 comprising a trace buffer and where the switch is capable of monitoring the response by analyzing contents of the trace buffer.

15. The test system of claim 11 where the switch is capable of determining compliance responsive to the monitoring.

16. An article comprising a storage medium having stored thereon instructions, that, when executed by at least one device, result in:
  identifying data packets;
  modifying the data packets responsive to the identifying;
  transmitting the modified data packets; and
  monitoring a response to the transmitted data packets
    where modifying the data packets include intentionally corrupting selected data packets.

17. The article of claim 16 where modifying the data packets includes dropping a predetermined number of the data packets.

18. The article of claim 16 where identifying data packets includes identifying two or more sequential data packets having a predetermined type.

19. The article of claim 16 where monitoring the response includes storing a trace indicative of the response.

20. The article of claim 16 comprising determining standard compliance responsive to the trace.

* * * * *